United States Patent [19]

Gustafsson

[11] Patent Number: 4,885,772
[45] Date of Patent: Dec. 5, 1989

[54] APPARATUS FOR OBTAINING A HIGH SOUND LEVEL AND GOOD SOUND REPRODUCTION FROM A LOUDSPEAKING TELEPHONE

[75] Inventor: Sune M. Gustafsson, Tyresö, Sweden

[73] Assignee: Telefonaktiebolaget L M Ericsson, Stockholm, Sweden

[21] Appl. No.: 112,839

[22] PCT Filed: Jan. 22, 1987

[86] PCT No.: PCT/SE87/00024
§ 371 Date: Oct. 15, 1987
§ 102(e) Date: Oct. 15, 1987

[87] PCT Pub. No.: WO87/05176
PCT Pub. Date: Aug. 27, 1987

[30] Foreign Application Priority Data

Feb. 19, 1986 [SE] Sweden ................. 8600744

[51] Int. Cl.$^4$ ............................... H04M 1/60
[52] U.S. Cl. .................... 379/390; 379/388; 381/98
[58] Field of Search ............ 379/388, 395, 389, 390; 381/98, 99, 100, 101, 102, 103, 68.2

[56] References Cited

U.S. PATENT DOCUMENTS

| 4,315,109 | 2/1982 | Jacobson | 379/390 X |
| 4,340,778 | 7/1982 | Cowans et al. | 381/99 |
| 4,481,662 | 11/1984 | Long et al. | 381/98 |
| 4,709,391 | 11/1987 | Kaizer et al. | 381/98 |

FOREIGN PATENT DOCUMENTS

| 1148091 | 6/1983 | Canada | 381/99 |
| 2126456 | 3/1984 | United Kingdom . | |

Primary Examiner—Jin F. Ng
Assistant Examiner—Randall S. Vaas
Attorney, Agent, or Firm—Burns, Doane, Swecker & Mathis

[57] ABSTRACT

Apparatus for obtaining a high sound level and good sound reproduction from a loudspeaking telephone powered from the line. The apparatus includes a loudspeaker element which has a relatively high Q value, and the resonance frequency of which is within the frequency band within which a speech spectrum has the greatest amplitude. The power supplied to the telephone is utilized effectively by the amplifier of the loudspeaker element having lower gain for frequencies in the vicinity of the resonance frequency of the loudspeaker element than for higher frequencies.

4 Claims, 3 Drawing Sheets

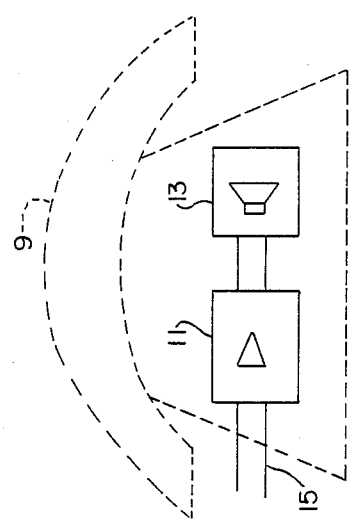

APPARATUS FOR OBTAINING A HIGH SOUND LEVEL AND GOOD SOUND REPRODUCTION FROM A LOUDSPEAKING TELEPHONE

TECHNICAL FIELD

The invention relates to an apparatus for obtaining a high sound level and good sound reproduction from a loudspeaking telephone. The apparatus is particularly suited to a telephone powered from the line, in which the power supply is limited.

BACKGROUND ART

The loudspeaker amplifier in a line-powered loudspeaking telephone is easily excited to maximum level due to only limited power being available from the telephone network. This causes distortion, which is often already noticeable at normal speech levels and which can be heavy for high speech levels.

Simple and cheap loudspeaker elements usually have small diaphragm masses and small magnet systems, which give low mechanical attenuation and thereby a high Q-value. The efficiency of such loudspeaker elements is considerably higher for frequencies in the vicinity of the resonance frequency than for higher and lower frequencies. In the utilisation of such loudspeaker elements, a large part of the acoustic effect must therefore be attenuated with the aid of suitable absorbents in a sealed loudspeaker box so that the resulting efficiency will be relatively uniform. It will also be rather low, however. It is therefore generally the case in loudspeaking telephones to use expensive loudspeaker elements with relatively uniform efficiency. However, here also the elements must be mounted conventionally in a closed box with absorbents for attenuating resonances.

DISCLOSURE OF INVENTION

The object of the present invention is to provide an apparatus with which the power supplied to a loudspeaking telephone may be utilised effectively such as to give a high sound level and good sound reproduction. This is achieved by the apparatus including a loudspeaker element with a relatively high Q value, the resonance frequency of which is in the vicinity of the power maximum of a speech spectrum, and by utilising a loudspeaker amplifier with frequency-dependent gain, which compensates for the frequency-dependent efficiency of the loudspeaker element. With the aid of the apparatus in accordance with the invention a simple and cheap loudspeaker element can be utilised without being mounted in a closed box provided with attenuating absorbents. The apparatus also achieves that the sound level may be higher and distortion lower than in conventional apparatus having a uniform frequency response in the loudspeaker amplifier and uniform efficiency in the loudspeaker.

The characterizing features of the invention are disclosed in the claims.

BRIEF DESCRIPTION OF DRAWINGS

The invention will now be described in detail below with reference to the drawings, on which

FIG. 7 illustrates the principal elements of the present invention.

BEST MODE FOR CARRYING OUT THE INVENTION

Referring first to FIG. 7, the principal elements of the present invention are a loudspeaker 13 as driven by an amplifier 11, both incorporated, for example, in a telephone 9. The amplifier is connected to the telephone line 15. Such a combination is, of course, known in the art, the present invention more particularly residing in the characteristics of the loudspeaker 13 and the amplifier 11, to be described presently.

Figure 1:
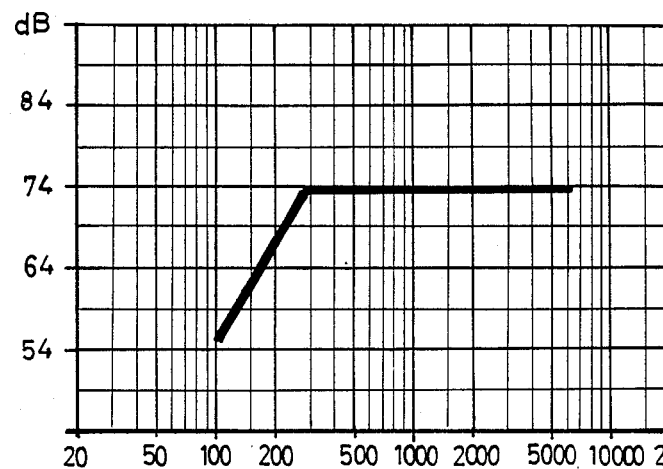
FIG. 1 illustrates a tone curve for a loudspeaker with relatively uniform efficiency.

An example of a tone curve is illustrated in FIG. 1, i.e. the acoustic power as a function of the tone frequency, for a loudspeaker with relatively uniform efficiency. According to the example, the efficiency increases with the frequency up to 300 Hz and is subsequently constant. As has also been made clear earlier, a rather expensive loudspeaker element must be utilised, which is mounted in a pressure chamber with suitable absorbents for obtaining uniform and high efficiency.

Figure 2:
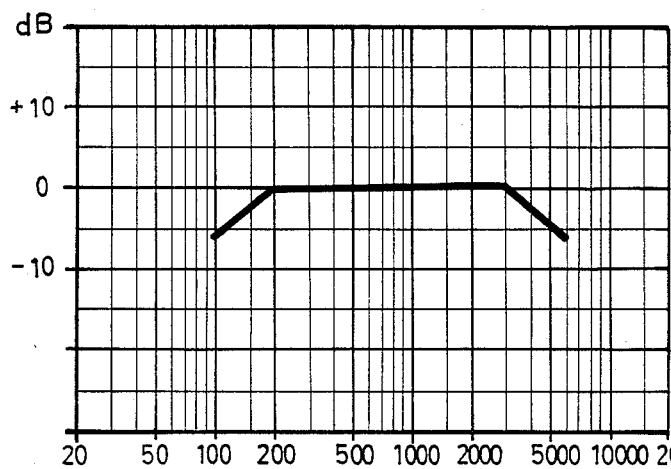
FIG. 2 illustrates a curve of the frequency spectrum of a conventional loudspeaker amplifier.

In FIG. 2 there is illustrated a curve constituting an example of the frequency response, i.e. the gain as a function of the tone frequency, of a conventional loudspeaker amplifier. The gain increases with the frequency up to 200 Hz, is constant between 200 and 3000 Hz, and decreases for frequencies over 3000 Hz.

Figure 3:
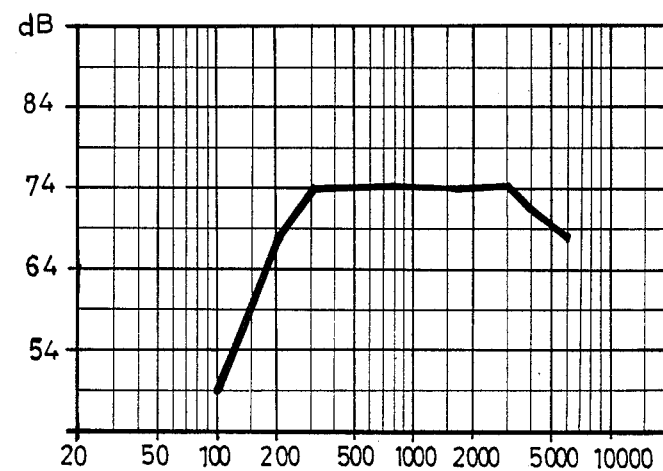
FIG. 3 illustrates a resulting tone curve for a loudspeaker with relatively uniform efficiency and a conventional loudspeaker amplifier.

In FIG. 3 there is illustrated the resulting tone curve for a loudspeaker having relatively uniform efficiency and a conventional loudspeaker amplifier. The acoustic power is constant in the 300–3000 Hz frequency band and decreases for frequencies outside this frequency band.

The illustrated and described curves of FIGS. 1–3, as well as the curves according to FIGS. 4–6, described below, are somewhat simplified and idealised. The intention with them is primarily to provide simplified examples which illustrate the present invention in an easily understood manner.

The graphical representation of a speech spectrum comprises a plurality of waves, the maximum and minimum values of which successively decrease towards higher frequencies. Voice power thus increases and decreases alternatingly towards higher frequencies, which is due to resonance phenomena in the speech organs. The different frequency bands within each of these waves is to be found are usually called formants. The greatest voice power lies substantially within the 400–600 Hz frequency band.

As will be seen from above, a loudspeaker amplifier easily reaches maximum excitation level if it is used in a loudspeaking telephone, this being due to the limited power supply. Such maximum excitation occurs above all in the frequency band for maximum voice power and causes distortion, which can already be noticeable at normal voice levels and which becomes heavy at high voice levels.

In accordance with the present invention, a simple and cheap loudspeaker element with low mechanical attenuation and a high Q value can be utilised with advantageous results in a loudspeaking telephone without being mounted in a pressure chamber. The conditions here are that the resonance frequency of the loudspeaker element is at, or in the vicinity of, the maximum power of the speech spectrum, and in that the frequency-dependent efficiency of the loudspeaker element is compensated electrically by a loudspeaker amplifier having frequency-dependent gain. The resonance frequency of the loudspeaker element should therefore suitably be about 500 Hz, since the voice spectrum has a maximum level at between about 400 and 600 Hz. The loudspeaker amplifier should have comparatively low gain in this frequency band, in which the loudspeaker element has per se, high efficiency. In an ideal case, the compensation should take place in a way such that the resulting efficiency of the amplifier and loudspeaker element will be just as great for all frequencies. However, this is difficult to achieve in practice, at least to a resonable cost. However, it is essential that the gain is lower for frequencies in the vicinity of the loudspeaker element resonance frequency than for higher frequencies.

Figure 4:
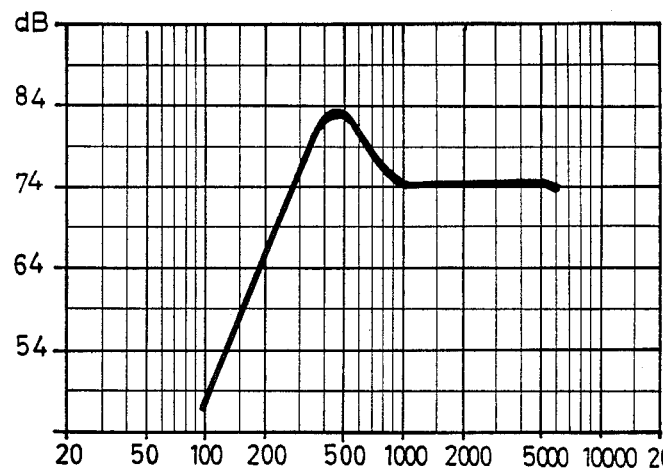
FIG. 4 illustrates a tone curve for a loudspeaker element used in accordance with the invention.

In FIG. 4 there is illustrated an example of a tone curve for a loudspeaker element used in the apparatus in accordance with the present invention. The tone curve is derived from measurements with the loudspeaker element mounted in a telephone set without a pressure chamber. The loudspeaker element Q value is about 3 and its resonance frequency is about 450 Hz. The loudspeaker element has an efficiency varying with the tone frequency and increasing up to the resonance frequency, subsequent to which it tapers off up to about 1000 Hz and is constant for higher frequencies. The acoustic power is about 9 dB higher at the resonance frequency than at the frequency of 1000 Hz.

Figure 5:
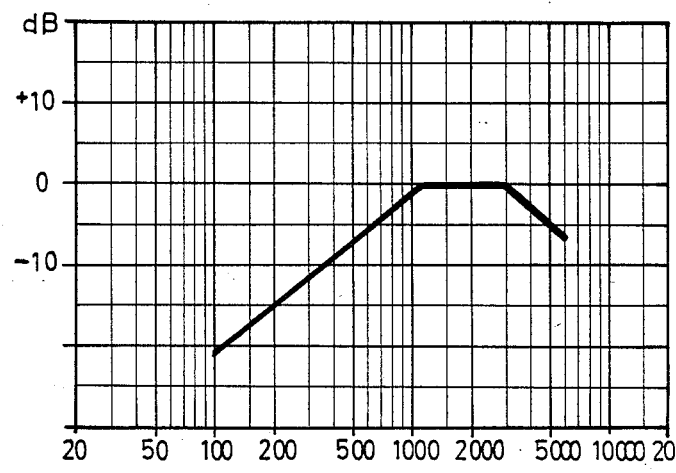
FIG. 5 illustrates a curve of the frequency response of a loudspeaker amplifier used in accordance with the invention.

In FIG. 5 there is illustrated a curve constituting an example of the frequency response of a loudspeaker amplifier intended for use in the loudspeaker in accordance with the present invention. The gain increases with frequency up to 1000 Hz, is constant between 1000 Hz and 3000 Hz and decreases for frequencies over 3000 Hz.

Figure 6:
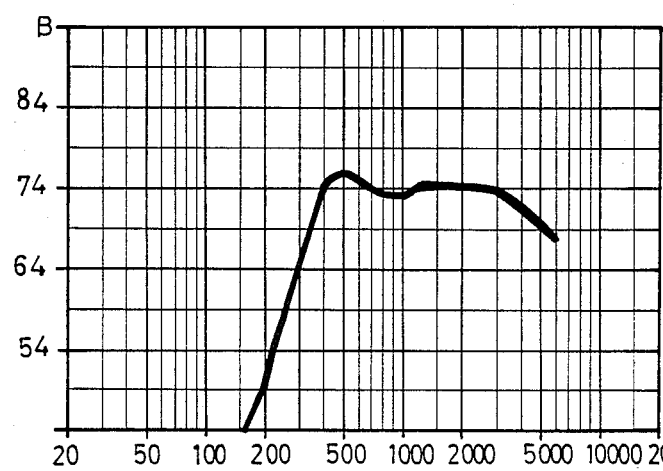
FIG. 6 illustrates a resulting tone curve for a loudspeaker element and a loudspeaker amplifier, which are used in accordance with the invention

In FIG. 6, there is illustrated an example of a resulting tone curve for a loudspeaker element and a loudspeaker amplifier, which are intended for use in the apparatus in accordance with the present invention. In this case, the loudspeaker element is not mounted in a closed box and has an efficiency such that its tone curve concurs with the tone curve according to FIG. 4. The loudspeaker amplifier has the same frequency response as the frequency response according to FIG. 5. The frequency-dependent efficiency of the loudspeaker element in combination with the relatively low gain of the amplifier at low frequencies results in a somewhat lower sound level at frequencies under about 400 Hz than in the conventional amplifier-loudspeaker combination according to FIG. 3. In practice, the tone curve will be somewhat less uniform than the one for the conventional combination, due to the amplifier gain increasing with frequency up to about 1000 Hz, and due to the loudspeaker element not being mounted in a closed box. However, there is achieved the essential advantage that a high sound level is obtained in the frequency band for maximum voice power, i.e. in the 400–600 Hz frequency range, simultaneously as distortion decreases. This is due to the available power being utilised in a considerably more effective way than previously, resulting in that the amplifier is not so easily excited to maximum level in the frequency band where speech is strongest. In the illustrated example, see FIG. 5, the gain is 7 dB lower for the frequency of 500 Hz than with the conventional amplifier. As will have become apparent from above, there is also achieved that a simpler and cheaper loudspeaker element can be used, and that this does not need to be mounted in a closed pressure chamber. The resonance frequency of the loudspeaker element is selected in the example to be about 450 Hz, i.e. somewhat lower than 500 Hz which is at the middle of the 400–600 Hz frequency band. The intention with this is to compensate to a certain extent for the relatively low efficiency of the loudspeaker element and the relatively low gain of the amplifier for frequencies below the resonance frequency. This is not necessary, however.

The illustrated and described values and curves merely constitute illustrative examples in order to facilitate understanding of the invention. The properties of the loudspeaker element and the amplifier may thus be varied within the scope of the invention so that these values and curves are changed to a certain extent. What is essential is that the loudspeaker element has its greatest efficiency at, or in the vicinity of the frequency band within which a voice spectrum has the greatest amplitude and in that the loudspeaker amplifier has lower gain in this frequency band than for higher frequencies, so that the available power can be utilised in an effective manner. In such a case, the Q value of the loudspeaker element should be greater than 1.

I claim:

1. A line-powered loudspeaking telephone for obtaining a desired sound level and low distortion sound reproduction comprising a loudspeaker element driven by an amplifying means, characterized in that the loudspeaker element has frequency-dependent efficiency due to its Q value, that the resonance frequency of the loudspeaker element is within the frequency band constituting the speech formant wherein a speech spectrum normally has the greatest amplitude, and in that a gain of the amplifying means is lower for frequencies within a first frequency band containing the resonance frequency of the loud-speaker element than for frequencies within a second, adjacent frequency band containing higher frequencies than said first frequency band, said gain substantially increasing with frequency for frequencies within said first frequency band and remaining substantially constant for frequencies within said second frequency band.

2. Apparatus as claimed in claim 1, characterized in that the resonance frequency of the loudspeaker element is within the 400–600 Hz frequency band.

3. Apparatus as claimed in claim 1, characterized in that the Q value of the loudspeaker element is greater than 1.

4. Apparatus as claimed in claim 2, characterized in that the Q value of the loudspeaker element is greater than 1.

* * * * *